(12) United States Patent
Woo (10) Patent No.: US 7,896,503 B2
(45) Date of Patent: Mar. 1, 2011

(54) IMAGE PROJECTING APPARATUS

(75) Inventor: Sung-je Woo, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1029 days.

(21) Appl. No.: 11/703,186

(22) Filed: Feb. 7, 2007

(65) Prior Publication Data
US 2007/0291235 A1 Dec. 20, 2007

(30) Foreign Application Priority Data
Jun. 19, 2006 (KR) .................... 10-2006-0055106

(51) Int. Cl.
*G03B 21/16* (2006.01)
*H04N 5/74* (2006.01)
(52) U.S. Cl. ........................ 353/61; 348/748
(58) Field of Classification Search .................. 353/61, 353/57, 58, 60, 119; 348/748; 362/373, 362/294; 352/202
See application file for complete search history.

(56) References Cited

U.S. PATENT DOCUMENTS

| 5,951,136 | A * | 9/1999 | Furuhata et al. ............... 353/31 |
| 6,443,575 | B1 * | 9/2002 | Miyamoto et al. ............ 353/58 |
| 6,497,489 | B1 * | 12/2002 | Li et al. ........................ 353/61 |
| 7,083,286 | B2 * | 8/2006 | Kim et al. ..................... 353/61 |
| 2002/0015138 | A1 * | 2/2002 | Ito et al. ........................ 353/57 |
| 2004/0263799 | A1 * | 12/2004 | Lim ............................ 353/61 |

FOREIGN PATENT DOCUMENTS

| CN | 1187634 A | 7/1998 |
| CN | 1580942 A | 2/2005 |
| JP | 2002-090875 | 3/2002 |
| JP | 2003-215711 | 7/2003 |
| JP | 2005-031370 | 2/2005 |
| JP | 2005-345821 | 12/2005 |
| KR | 10-2002-0017417 | 3/2002 |
| KR | 10-2003-0019625 | 3/2003 |

* cited by examiner

*Primary Examiner*—Georgia Y Epps
*Assistant Examiner*—Ryan Howard
(74) *Attorney, Agent, or Firm*—Roylance, Abrams, Berdo & Goodman, L.L.P.

(57) ABSTRACT

An image projecting apparatus includes a main body casing comprising an inlet provided to a lower part thereof, and an outlet spaced from the inlet. A heat generating part generates heat in an inner part of the main body casing. A cooling duct coupled to the main body casing communicates with the inlet and the outlet, and has a channel guiding cooling air drawn in through the inlet to the heat generating part and accommodates the heat generating part therein. Thus, an image projecting apparatus is provided having a simplified cooling configuration for cooling a heat generating part, thereby improving cooling efficiency, and substantially reducing noise and costs.

16 Claims, 7 Drawing Sheets

IMAGE PROJECTING APPARATUS

CROSS-REFERENCE TO RELATED APPLICATIONS

This application claims the benefit under 35 U.S.C. §119(a) of Korean Patent Application No. 2006-0055106, filed on Jun. 19, 2006 in the Korean Intellectual Property Office, the entire disclosure of which is hereby incorporated by reference.

BACKGROUND OF INVENTION

1. Field of Invention

The present invention relates to an image projecting apparatus. More particularly, the present invention relates to an image projecting apparatus having an improved cooling configuration of a heat generating part.

2. Description of the Related Art

Generally, an image projecting apparatus includes a heat generating part, such as a light source, an optical unit, and so forth, and projects an image on a screen. The image projecting apparatus comprises a projection television, a projector, and so forth. The image projecting apparatus includes a CRT (cathode ray tube) type, an LCD (liquid crystal display) type, and a DLP (digital light processing) type using a DMD (digital micro-mirror device).

Hereinafter, a projector is described as one example thereof.

Generally, a projector includes a light source part including a large output lamp or a plurality of LEDs (light emitting diodes), and a display element including a liquid crystal display or a DMD. When the light source part and the display element operate, they generate heat. The heat raises the temperature of optical components of the projector that may damage them or reduce the durability thereof.

To solve this problem, the projector is provided with a forced air cooling system, which includes a cooling fan and a duct.

A conventional projector includes a plurality of cooling fans supplying cooling air to a plurality of heat generating parts, such as a lamp, and a plurality of ducts connected with the cooling fans to guide the cooling air to the respective heat generating parts. Accordingly, the cooling air provided by the cooling fans emits heat from the heat generating parts to the outside to prevent the temperature inside the projector from increasing.

Japanese Patent First Publication No. 2005-345821 discloses a duct and a fan supplying air to an optical apparatus to cool the optical apparatus generating heat. Korean Patent First Publication No. 2002-17417 discloses an inlet fan and an outlet fan for cooling a liquid crystal panel. Korean Patent First Publication No. 2003-19625 discloses a cooling fan and a cooling duct for intensively cooling a light source lamp.

The cooling system of the conventional projector uses a plurality of fans and ducts to cool only a specific heating generating part, and the fans are complicatedly disposed. Accordingly, a cooling efficiency thereof is deteriorated. Also, the plurality of fans and the complicated cooling configuration increase costs, and generate substantial noise.

Accordingly, a cooling system capable of efficiently and entirely cooling a heat generating part of an image projecting apparatus has been under development.

Thus, a need exists for an image projecting apparatus having an improved cooling system to improve cooling efficiency, reduce generated noise, and reduce costs.

SUMMARY OF THE INVENTION

Accordingly, an aspect of the present invention is to provide an image projecting apparatus simplifying a cooling configuration for cooling a heat generating part, thereby improving a cooling efficiency, and reducing noise and costs.

The foregoing and/or other aspects of the present invention may be achieved by providing an image projecting apparatus comprising a main body casing comprising an inlet disposed in a lower part thereof, and an outlet spaced from the inlet. A heat generating part generates heat in an inner part of the main body casing. A cooling duct is coupled to the main body casing to communicate with the inlet and the outlet, and comprises a channel guiding cooling air drawn inthrough the inlet to the heat generating part and accommodates the heat generating part therein.

According to an exemplary embodiment of the present invention, the image projecting apparatus further comprises a cooling fan accommodated in the cooling duct.

According to an exemplary embodiment of the present invention, the outlet is disposed in a side part of the main body casing.

According to an exemplary embodiment of the present invention, a plurality of inlets are disposed in the lower part of the main body casing adjacent to the heat generating part.

According to an exemplary embodiment of the present invention, the cooling duct comprises an inlet duct provided between the inlet and the cooling fan, and an outlet duct provided between the cooling fan and the outlet.

According to an exemplary embodiment of the present invention, the heat generating part comprises a light source part comprising a lamp emitting light, and a lamp supporting member supporting the lamp, a ballast driving the light source part, and a wheel driving part driving a color wheel separating the light emitted from the light source part into red, green and blue. A display element uses the light emitted from the light source part to generate an image signal. An element driving part drives the display element. A power supplying part supplies power.

According to an exemplary embodiment of the present invention, the inlet comprises a first inlet and a second inlet spaced from one another, The inlet duct comprises a first inlet duct communicating the first inlet with the cooling fan to guide the cooling air to the element driving part and the power supplying part, and a second inlet duct communicating the second inlet with the first inlet duct to guide the cooling air to the display element.

According to an exemplary embodiment of the present invention, the image projecting apparatus further comprises at least one sub cooling fan coupled to at least one of the first inlet and the second inlet to generate the cooling air.

According to an exemplary embodiment of the present invention, the image projecting apparatus further comprises a channel dividing member dividing a channel of the outlet duct into a first exhaling channel cooling the ballast and the wheel driving part and a second exhaling channel cooling the light source part to separately guide the cooling air supplied from the cooling fan.

According to an exemplary embodiment of the present invention, a surface of the channel dividing member facing the light source part is coated with an ultraviolet filter to transmit a visible ray emitted from the light source part.

According to an exemplary embodiment of the present invention, the outlet duct comprises an exhaling joining channel in which the cooling air exhausted from the first exhaling channel and the cooling air exhausted from the second exhaling channel are joined.

According to an exemplary embodiment of the present invention, the image projecting apparatus further comprises a channel partitioning member partitioning the second exhaling channel into a first partitioned channel cooling a lamp of the light source part and a second partitioned channel cooling the lamp supporting member of the light source part.

According to an exemplary embodiment of the present invention, the first partitioned channel further comprises a converging member converging the cross section of the channel thereof to guide the cooling air to the lamp.

According to an exemplary embodiment of the present invention, the image projecting apparatus further comprises a light intercepting member provided to the outlet duct to prevent the light emitted from the light source part from being transmitted to the outlet.

According to an exemplary embodiment of the present invention, the image projecting apparatus further comprises a sound absorbing member coupled to an inner part of the outlet duct to substantially prevent noises generated by the flow of the cooling air.

The foregoing and/or other aspects of the present invention may be achieved by providing an image projecting apparatus comprising a main body casing comprising an inlet, and an outlet spaced from the inlet. A cooling duct is coupled to the main body casing to communicate with the inlet and the outlet. A channel separating member drawn ininletforms a plurality of channels in the cooling duct to divide cooling air drawn through the inlet. A plurality of heat generating parts are respectively accommodated in the plurality of channels of the cooling duct, and generate heat.

According to the embodiment of the present invention, the cooling duct comprises a joining channel in which the cooling air is joined after heat exchange with the plurality of the heat generating parts accommodated in the plurality of channels.

According to an exemplary embodiment of the present invention, the channel separating member of the cooling duct has a planar shape to divide the cooling air and to form an upper channel and a lower channel.

According to an exemplary embodiment of the present invention, the cooling duct further comprises a channel converging member provided to the upper channel of the channel separating member to converge the cooling air flowing through the upper channel in a predetermined direction.

According to an exemplary embodiment of the present invention, the channel converging member has a cylindrical shape, the cross section of which tapers along a flow direction of the cooling air.

The foregoing and/or other aspects of the present invention may be achieved by providing an image projecting apparatus comprising a main body casing comprising an inlet, and an outlet distanced from the inlet; a cooling duct coupled to the main body casing to communicate with the inlet and the outlet, and comprising a channel converging member converging a cooling air drawn indrawn in through the inlet when the cooling air flows through the cooling duct; and a heat generating part disposed in a channel of the cooling air flowing through the channel converging member of the cooling duct, and generating heat.

According to an exemplary embodiment of the present invention, the heat generating part comprises a lamp emitting light.

According to an exemplary embodiment of the present invention, the channel converging member has a cylindrical shape, the cross section of which tapers along a flowing direction of the cooling air.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

The above and/or other aspects and advantages of the present invention are apparent and are more readily appreciated from the following description of the exemplary embodiments, taken in conjunction with the accompanying drawings, in which.

Throughout the drawings, like reference numerals will be understood to refer to like parts, components and structures.

DETAILED DESCRIPTION OF EXEMPLARY EMBODIMENTS

Reference will now be made in detail to exemplary embodiments of the present invention, examples of which are illustrated in the accompanying drawings. The exemplary embodiments of the present invention are described below with reference to the figures.

Hereinafter, a projector is described by way of example. However, the exemplary embodiments of the present invention may be applied to an image projecting apparatus, such as a projection television, and so forth.

As shown in FIGS. 1 to 6, an image projecting apparatus 1 according to an exemplary embodiment of the present invention includes a main body casing 100 including at least one inlet 103 and outlet 105, a plurality of heat generating parts 200, a cooling duct 400 connected between the inlet 103 and the outlet 105 to guide external air to the heat generating parts 200 accommodated in the main body casing 100, and a cooling fan 450 supplying external air into the cooling duct 400 to cool the heat generating part 200.

Figure 1:
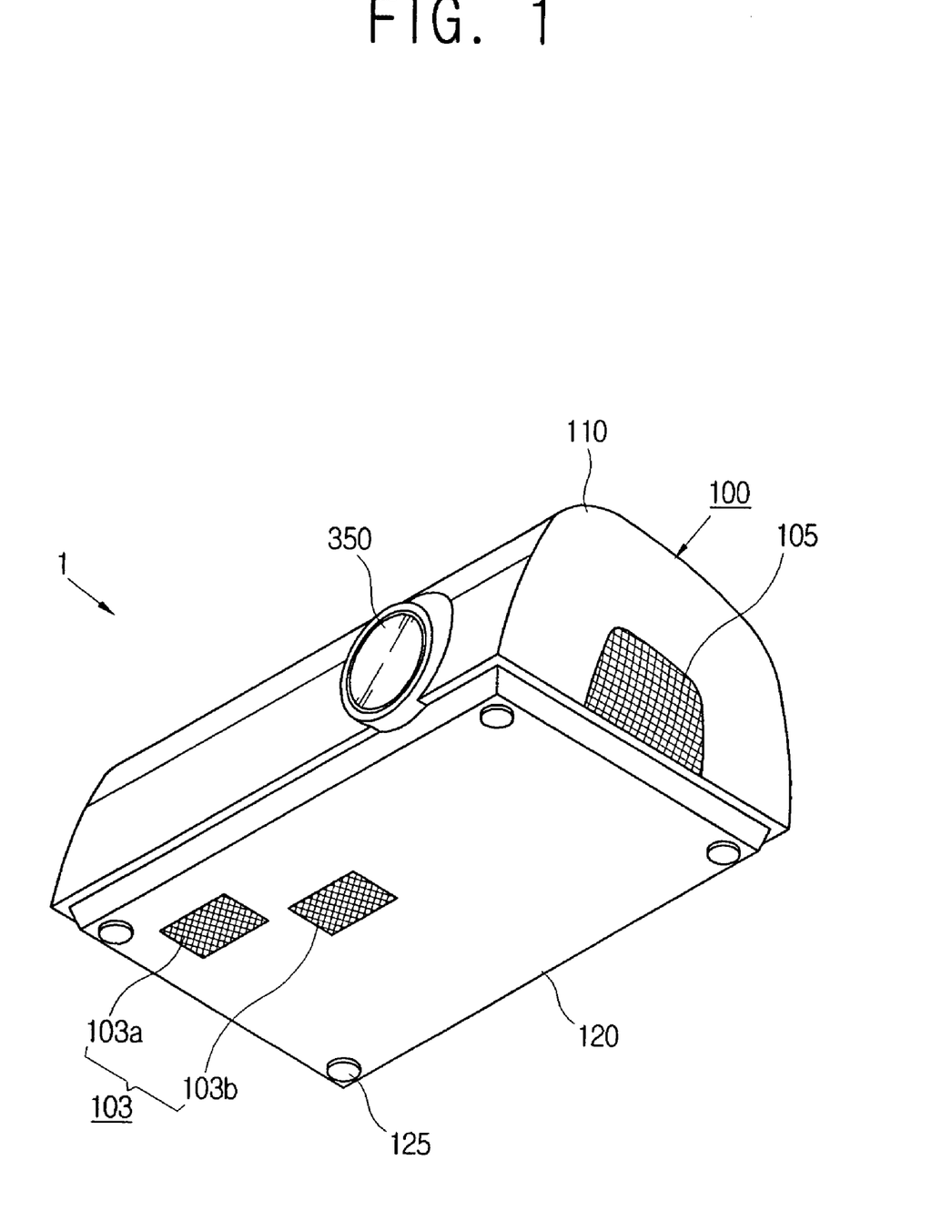
FIG. 1 is a perspective view of an image projecting apparatus according to an exemplary embodiment of the present invention.

Referring to FIG. 1, the main body casing 100 forms an external appearance of the image projecting apparatus 1. The main body casing 100 may include an upper casing 110 and a lower casing 120. The lower casing 120 may include a plurality of supporting parts 125 protruding downwardly from edges of a bottom surface of the lower casing 120 so that external air is smoothly drawn in when external air is drawn in through the bottom surface of the lower casing 120.

The main body casing 100 is supported on an installation surface, such as a table. The lower casing 120 may include a means (not shown) for adjusting the height of the image projecting apparatus 1 as necessary.

The main body casing 100 is provided with the inlet 103 through which external air is drawn in, and the outlet 105 exhausting internal air heated by the heat generating part 200 to the outside. The drawn in external air cools the heat generating part 200, and then is exhausted through the outlet 105.

The inlet 103 draws in external air, and is disposed in a proper part of the main body casing 100 depending on the position of the heat generating part 200, the shape of an inlet duct 410, and so forth. Referring to FIG. 1, the inlet 103 is preferably provided in a bottom surface of the lower casing 120 to reduce noises generated due to the flow of drawn in air.

Referring to FIG. 1, the inlet 103 may comprise a first inlet 103a and a second inlet 103b spaced from each other. The inlet 103 communicates with inlet duct inlets 423 and 433 of the inlet duct 410.

The inlet 103 may comprise a plurality of holes formed through a bottom of the main body casing 100 and having a substantially rectangular shape, a circular shape, or any other suitable shape. Alternatively, the inlet 103 may comprise an opening coupled with the inlet duct inlets 423 and 433 including a plurality of through holes having a substantially rectangular shape, a circular shape, or any other suitable shape.

The outlet 105 exhausts to the outside of the main body casing 100 air that is drawn into the main body casing 100 through the inlet 103 to cool the heat generating part 200. Referring to FIG. 1, the outlet 105 is preferably provided in a side surface of the main body casing 100 to prevent drawn in air and exhausted air from being mixed in the case when the inlet 103 is provided in the bottom surface of the main body casing 100.

The outlet 105 communicates with an outlet duct outlet 445 of an outlet duct 410. The outlet 105 has a size depending upon the amount of exhausted internal air flux, the shape of an outlet duct 440, aesthetic appearance, and so forth. The outlet 105 may have a shape similar to the inlet 103.

Figure 2:
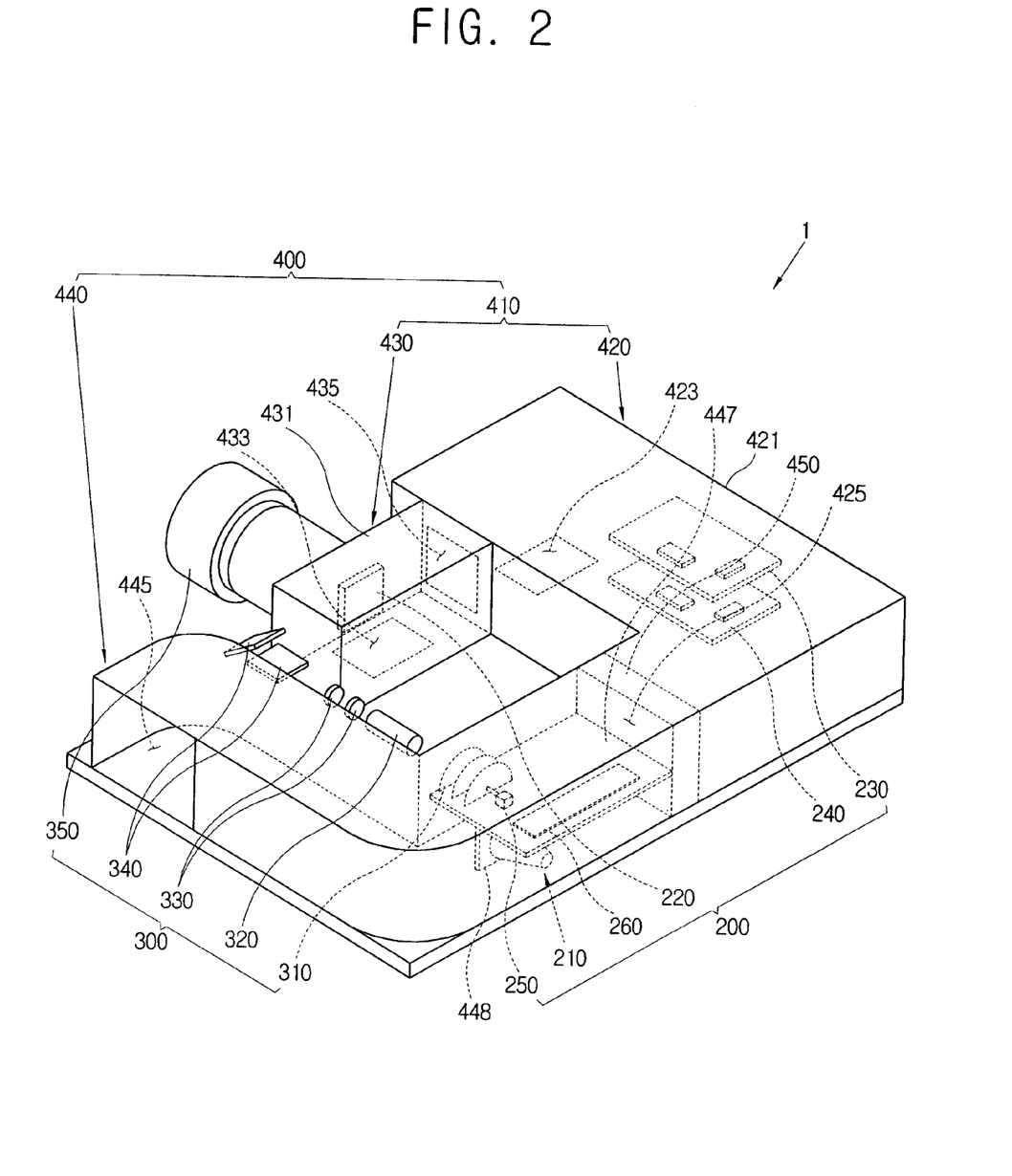
FIG. 2 is a perspective view of a cooling duct and a heat generating part according to an exemplary embodiment of the present invention.

Referring to FIG. 2, the heat generating part 200 includes a light source part 210 for emitting light, a display element 220 for using the light emitted from the light source part 210 to generate an image signal, an element driving part 230 for driving the display element 220, a power supplying part 240 for supplying power to the element driving part 230 and other parts requiring power, a wheel driving part 250 for driving a color wheel 310 that divides the light emitted from the light source part 210 into RGB (red, green and blue) lights, and a ballast 260 for driving the light source part 210.

Because the heat generating part 200 includes a plurality of chips to drive the device and to emit light, the heat generating part 200 generates a lot of heat. The heat may damage components or cause malfunctioning thereof.

Figure 5:
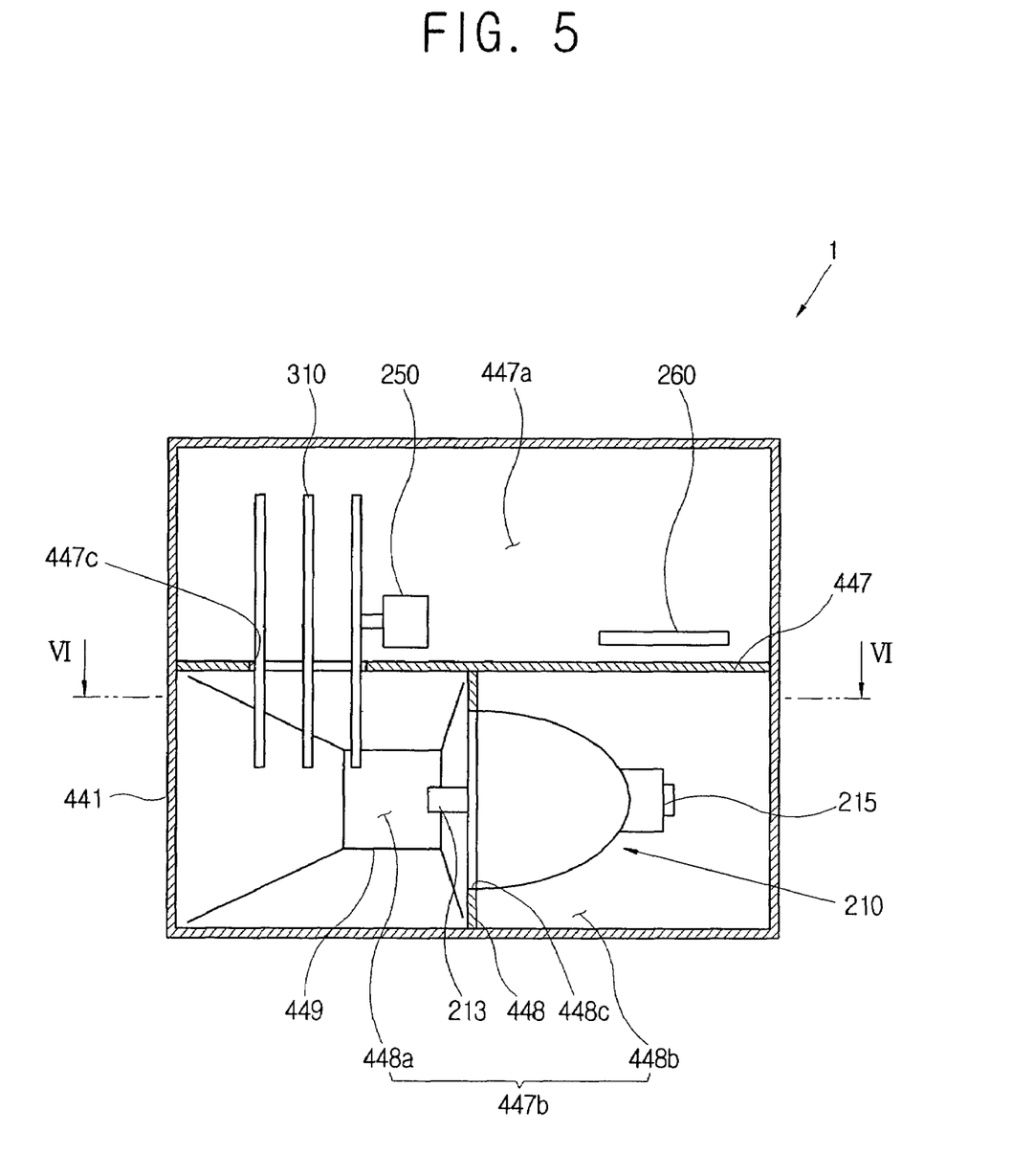
FIG. 5 is an elevational view in cross section taken along line V-V of FIG. 4.
Figure 6:
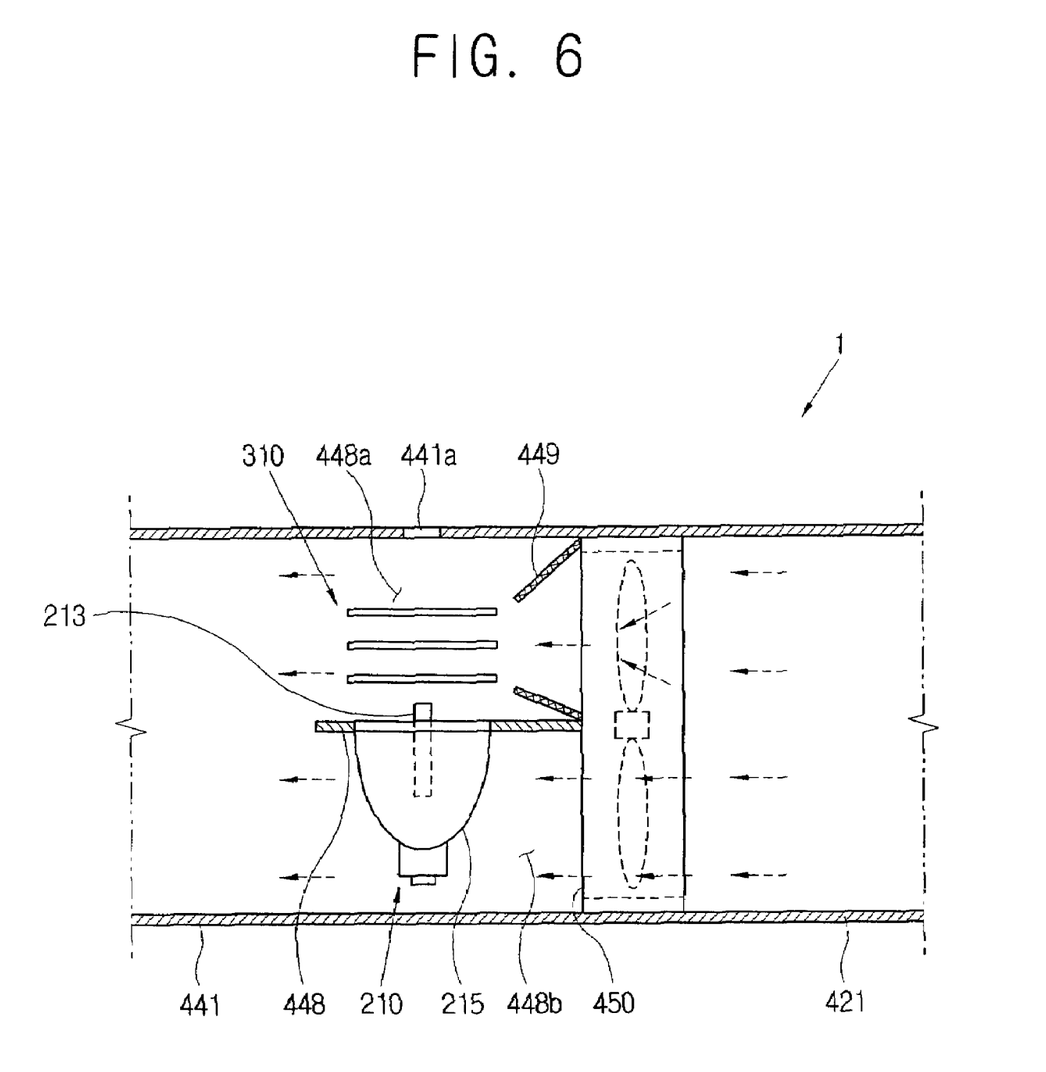
FIG. 6 is an elevational view in cross section taken along line VI-VI of FIG. 4.

As shown in FIGS. 5 and 6, the light source part 210 includes a lamp 213 for emitting light, and a lamp supporting member 215 for supporting the lamp 213. The light source part 210 may include a plurality of LEDs (light emitting diodes) respectively emitting a red light, a green light and a blue light, and an LED board (not shown) for supporting and driving the LEDs as necessary.

The lamp 213 may comprise a discharge lamp of an arc type, such as a mercury lamp, a metal halide lamp, and a xenon lamp.

The lamp supporting member 215 may include a reflecting mirror (not shown) for supporting the lamp 213 and for reflecting the light emitted from the lamp 213 toward a lighting lens 330.

Referring to FIG. 2, the display element 220 is disposed close to a part of a projecting lens 350 (indicated in FIG. 1), and uses the light emitted from the light source part 210 to generate an image signal. Referring to FIG. 2, the display element 220 may comprise a DMD (digital micro-mirror device) panel. Alternatively, the display element 220 may comprise an LCD (liquid crystal display) panel and an LCOS (liquid crystal on silicon) element. The DMD panel includes a lot of pixels having micro mirrors arranged on a plane, and controls on and off thereof by selecting a reflecting angle of the mirrors between a first angle or a second angle depending on an electroastic field operation of a memory element disposed to correspond to the respective pixels. Accordingly, because the DMD panel continuously reflects the light emitted from the light source part 210 so that the temperature of the DMD panel rapidly increases, the DMD panel should be cooled to maintain a proper temperature.

Figure 3:
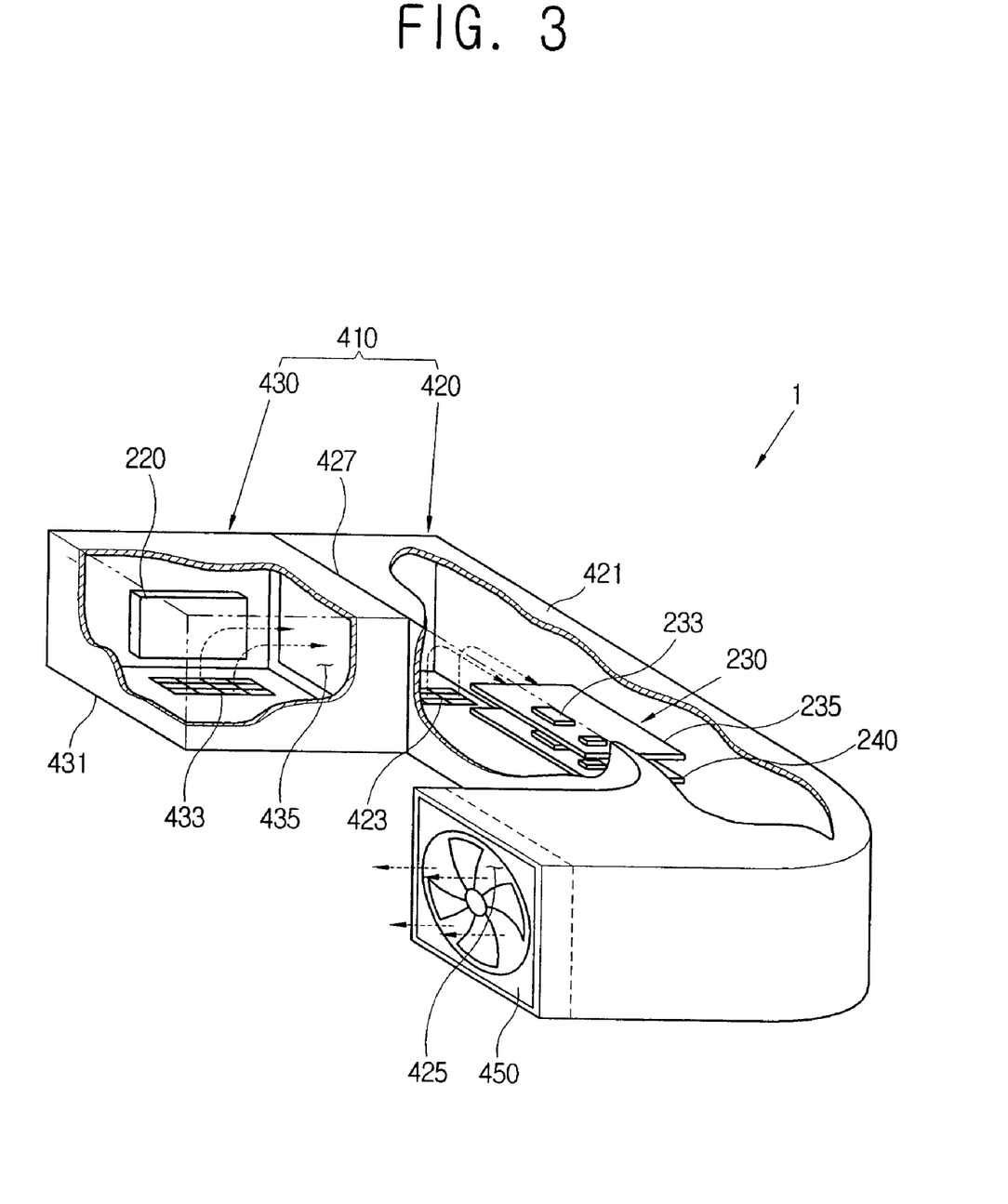
FIG. 3 is a partial cut away perspective view of an inlet duct of FIG. 2.

The element driving part 230 is electrically connected with the display element 220, and drives the display element 220 to generate an image. Referring to FIG. 3, the element driving part 230 includes a driving chip 233 and a main board 235. When the display element 220 is provided as the DMD panel, the driving chip 233 may comprise a DLP (digital light processor) chip. The element driving part 230 may include a main control part (not shown) for controlling the image projecting apparatus 1.

The power supplying part 240 supplies power to inner components, such as the element driving part 230, the wheel driving part 250 and cooling fan 450. The power supplying part 240 transforms an alternating current supplied from outside into predetermined powers suitable to the respective components, and supplies the powers thereto respectively. The power supplying part 240 generates heat when transforming powers.

The wheel driving part 250 comprises an electric motor, and is supplied with power from the power supplying part 240. The wheel driving part 250 generates heat by means of a coil provided to the electric motor.

When the light source part 210 includes a plurality of LEDs of a red LED, a green LED and a blue LED instead of the lamp 213, the light source part 210 may respectively light a red light, a green light and a blue light. Accordingly, the wheel driving part 250 and the color wheel 310 become unnecessary. Thus, the wheel driving part 250 is excluded from the heat generating part 200.

Figure 4:
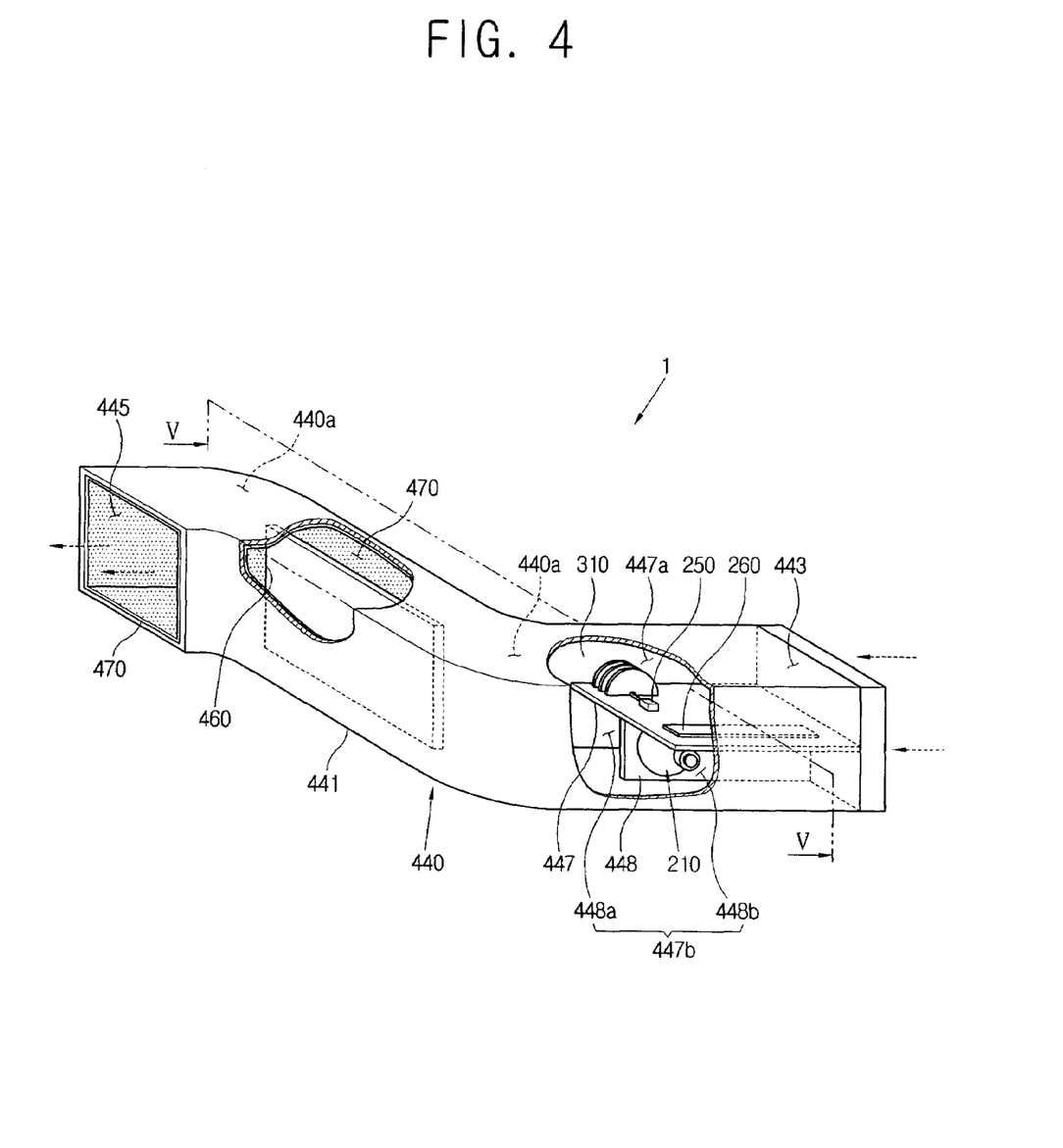
FIG. 4 is a partial cut away perspective view of an outlet duct of FIG. 2.

The ballast 260 drives the lamp 213, and prevents an overcurrent from being supplied to the lamp 213. Referring to FIGS. 2 and 4, the ballast 260 may be disposed adjacently to the lamp 213 (shown in FIG. 5 and FIG. 6).

The image projecting apparatus 1 includes an optical unit 300 projecting an image on a plane, such as a screen (not shown), by using the light emitted from the light source part 210.

Referring to FIG. 2, the optical unit 300 includes the color wheel 310 disposed in front of the lamp 213 to selectively transmit a specific color light among the light emitted from the lamp 213, a light tunnel 320 and the light lens 330 for converging the light emitted from the lamp 213, a reflecting mirror 340 for changing a light path, a prism (not shown) disposed in front of the display element 220 to reflect and transmit light, and the projecting lens 350 for enlarging and projecting an image formed by the display element 220.

The image projecting apparatus 1 with this configuration has a light path as described below. Light emitted from the lamp 213 passes through the light tunnel 320, the light lens 330 and the reflecting mirror 340 to be converged and reflected so that the path of light is changed. The light passing through the light lens 330 and the reflecting mirror 340 passes through the prism to be reflected and transmitted, and is transformed to an image light in the display element 220, and passes through the projecting lens 350 to be embodied on a plane, such as a screen (not shown), as an image.

Referring to FIGS. 1 to 4, the cooling duct 400 communicates with the inlet 103 and the outlet 105 of the main body casing 100 to form a cooling channel. The plurality of heat generating parts 200 are disposed inside the cooling duct 400 to be cooled by drawn in external air.

Figure 7:
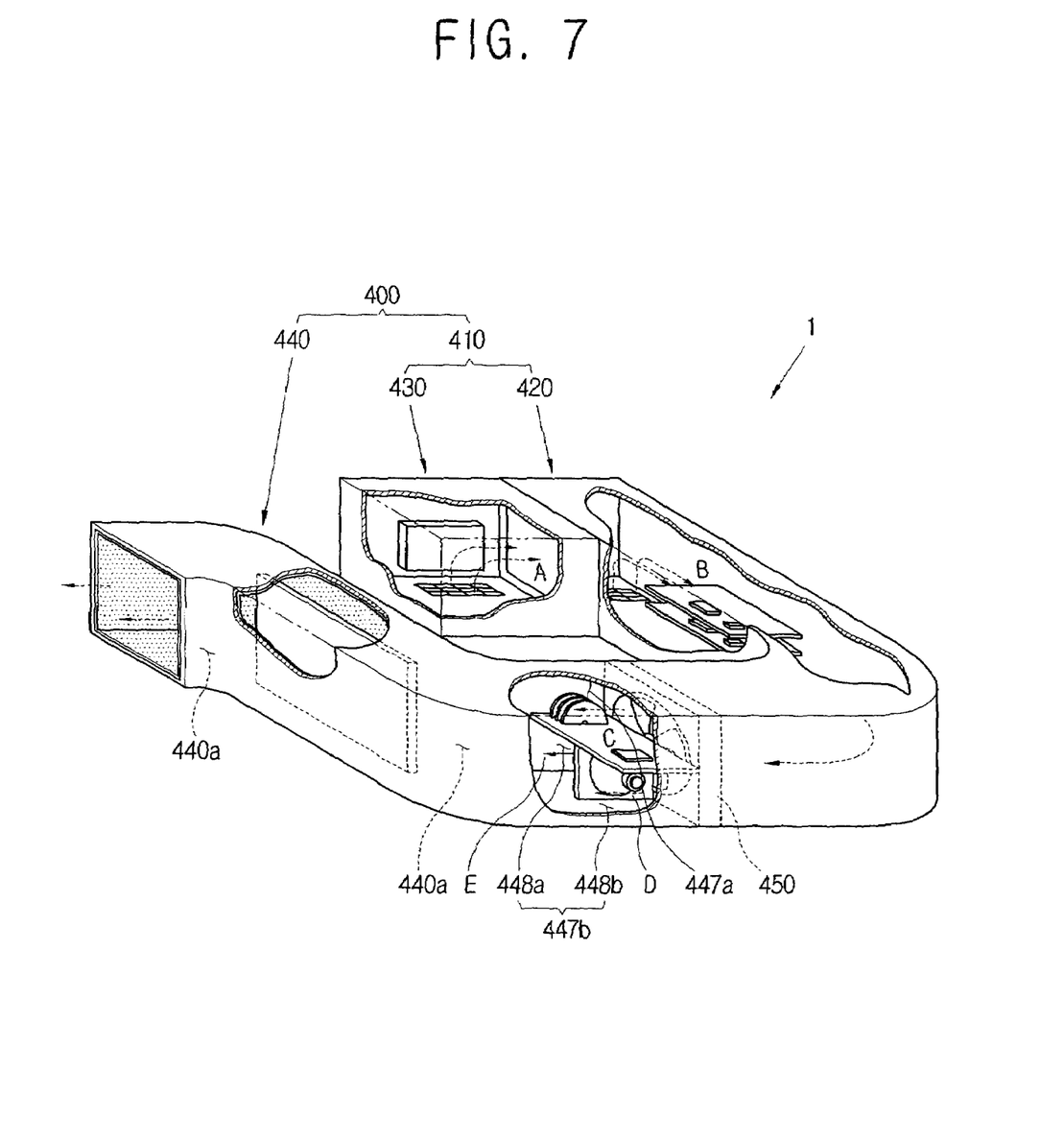
FIG. 7 is a perspective view illustrating cooling air flow in the image projecting apparatus of FIG. 1.

Referring to FIGS. 2 and 7, the cooling duct 400 includes the inlet duct 410 for guiding external air drawn in through the inlet 103 to the cooling fan 450, and the outlet duct 440 guiding internal air which is the external air heated by heat exchanges with the heat generating part 200, to the outlet 105.

The cooling duct 400 is coupled with the main body casing 100 by means of a known coupling means, such as a screw, or any other suitable fastener. The cooling duct 400 may be integrally formed of a plastic material by injection molding, or may be assembled by a known coupling means such as a screw, or any other suitable fastener, as necessary. The cooling duct 400 may comprise other configurations as long as it accommodates the heat generating part 200, and draws in and exhausts external air.

Referring to FIG. 3, the inlet duct 410 includes a first inlet duct 420 communicating with the first inlet 103a of the main body casing 100, and a second inlet duct 430 communicating with the second inlet 103b of the main body casing 100.

Referring to FIGS. 2 and 3, the first inlet duct 420 includes a first inlet duct body 421, and a first inlet duct coupling part 427 coupled to a second inlet duct outlet 435. The first inlet duct body 421 may be partitioned to form a divided external air channel, and the first inlet duct 420 may accommodate the element driving part 230 and the power supplying part 240 in the divided external air channel respectively as necessary.

The first inlet duct body 421 is provided with a first inlet duct inlet 423 communicating with the first inlet 103a, and a first inlet duct outlet 425 for guiding a cooling air to the cooling fan 450.

The element driving part 230 and the power supplying part 240 are accommodated inside the first inlet duct body 421.

The first inlet duct coupling part 427 may protrude from the first inlet duct body 421. The first inlet duct coupling part 427 may be coupled with the second inlet duct outlet 435 by means of a known coupling means such as a screw, or any other suitable fastener. Alternatively, the inlet duct 410 may be provided by forming a communicating opening after the first inlet duct 420 and the second inlet duct 430 are integrally formed.

Accordingly, external air drawn in through the second inlet duct 430 to cool the display element 220, and external air drawn in through the first inlet duct 420 join together. The joined external air cools the element driving part 230 and the power supplying part 240, and then is exhausted to the cooling fan 450.

Referring to FIG. 3, the second inlet duct 430 includes a second inlet duct inlet 433 communicating with the second inlet 103b, and a second inlet duct body 431 provided with the second inlet duct outlet 435 coupled with the first inlet duct coupling part 427. The second inlet duct body 431 may be partitioned, and the second inlet duct 430 may include an external air channel for dividing the inlet duct as necessary.

The display element 220 is accommodated inside the second inlet duct body 431.

The second inlet duct body 431 may be provided with a through hole (not shown) or the like so that an image formed in the display element 220 is transmitted to the prism and the projecting lens 350. The second inlet duct body 431 may be formed of a material that allows an image to transmit therethrough as necessary.

The second inlet duct body 431 may further accommodate the prism through which the image formed in the display element 220 is transmitted.

Referring to FIG. 4, the outlet duct 440 includes an outlet duct inlet 443, and an outlet duct body 441 provided with the outlet duct outlet 445.

The outlet duct inlet 443 is connected with the cooling fan 450.

The outlet duct outlet 445 communicates with the outlet 105 of the main body casing 100 to guide air moved by the cooling fan 450 to the outside.

Referring to FIGS. 4 to 6, the outlet duct body 441 accommodates the light source part 210, the ballast 260, and the wheel driving part 250. Referring to FIG. 4, the outlet duct body 441 may further accommodate the color wheel 310.

Referring to FIG. 6, the outlet duct body 441 may be provided with a light transmitted part 441a through which the light emitted from the light source part 210 reaches the light lens 330 outside the outlet duct body 441. The light transmitted part 441a may comprise a through hole formed in the outlet duct body 441 positioned on a light path from the lamp 213 to the light lens 330. Glass coated with an ultraviolet filter may be disposed to the light transmitted part 441a as necessary. Alternatively, the outlet duct body 441 may be formed of a transparent material, such as glass or plastic, coated with an ultraviolet filter instead of providing the light transmitted part 441a.

The image projecting apparatus 1 according to an exemplary embodiment of the present invention may further include a channel dividing member 447 dividing a channel of the outlet duct 440, or a channel partitioning member 448 partitioning the divided channel. The channel dividing member 447 and the channel partitioning member 448 divide the channel of the outlet duct 440 so that external air drawn in through the inlet 103 reaches a specific heat generating part. The channel dividing member 447 and the channel partitioning member 448 commonly are referred to as a channel separating member.

Referring to FIGS. 4 and 5, the channel dividing member 447 divides the outlet duct body 441 into a first exhaling channel 447a and a second exhaling channel 447b. Because the temperature of air around the lamp 213 is relatively high, the channel dividing member 447 substantially prevents heat generated from the lamp 213 from being transmitted to the ballast 260 and the color wheel 310.

At least one side surface of the channel dividing member 447 may be coated with an ultraviolet filter to allow only visible rays among the light emitted from the light source part 210 to transmit therethrough as necessary.

Referring to FIG. 5, the channel dividing member 447 is provided substantially parallel to a direction of the light emitted from the light source part 210. However, the channel dividing member 447 is preferably disposed in a predetermined direction to substantially prevent the light emitted from the light source part 210 from being reflected toward the light source part 210. A disposed direction of the channel dividing member 447 is properly determined depending on the rotation of the color wheel 310 and the disposition of the ballast 260.

The ballast 260 and the wheel driving part 250 are accommodated in the first outlet channel 447a, and the light source part 210 is accommodated in the second outlet channel 447b. An arrangement of the heat generating part 200 in the first outlet channel 447a and the second outlet channel 447b may be arranged oppositely to the above as necessary.

Referring to FIG. 5, when the color wheel 310 is accommodated in the first outlet channel 447a, the channel dividing member 447 may include a color wheel accommodating groove 447c so that the color wheel 310 smoothly rotates.

Referring to FIG. 4, the channel partitioning member 448 is disposed in the second outlet channel 447b under the channel dividing member 447, and partitions the second outlet channel 447b into a first partitioned channel 448a and a second partitioned channel 448b.

The channel partitioning member 448 is preferably formed in a thin plate shape to minimize channel blocking. Referring to FIGS. 4 and 5, the channel partitioning member 448 may be disposed substantially parallel to the outlet duct 440 and substantially perpendicular to the channel dividing member 447.

The channel dividing member 447 and the channel partitioning member 448 may be integrally formed to be coupled to an inner part of the outlet duct body 441.

Referring to FIG. 5, the channel partitioning member 448 includes a light source through hole 448c through which the light source part 210 penetrates. An insulating member (not shown) may be coupled to an inner surface of the light source through hole 448c to substantially prevent heat of the light source part 210 from being transmitted to the channel partitioning member 448.

Because the lamp 213 of the light source part 210 is accommodated in the first partitioned channel 448a, and the lamp supporting member 215 is accommodated in the second partitioned channel 448b, the external air flowing through the first partitioned channel 448a intensively cools the lamp 213.

Air flow through the first outlet channel 447a and the second outlet channel 447b are joined in an outlet joining channel 440a of the outlet duct 440. Accordingly, a relatively high temperature of air flowed through the first partitioned channel 448a is decreased after joining with air flowed through the first outlet channel 447a and the second partitioned channel 448b in the outlet channel 440a.

The image projecting apparatus 1 according to an exemplary embodiment of the present invention may further include a converging member 449 converging a cross section of the cooling channel to rapidly eject heat generated from the lamp 213 of the light source part 210 to the outside of the main body casing 100.

Referring to FIG. 5, the converging member 449 has a funnel shape to concentrate cooling air supplied from the cooling fan 450 to the lamp 213, and accordingly, the cross section of the channel converges along a lengthwise direction of the outlet duct 440. Accordingly, the lamp 213 generating heat of a relatively high temperature and the lamp supporting member 215 having a relatively low temperature may be cooled separately of one another.

Referring to FIG. 5, the converging member 449 is provided in a container shape having a substantially rectangular cross section. Alternatively, the converging member 449 may be provided in a cylindrical shape having a circular cross section.

Referring to FIGS. 3 and 4, the cooling fan 450 is disposed between the first inlet duct outlet 425 and the outlet duct inlet 443 to communicate the inlet duct 410 with the outlet duct 440. The cooling fan 450 may be accommodated in the cooling duct 400 (indicated in FIG. 2).

The cooling fan 450 draws in external air through the inlet 103, and exhausts internal air of high temperature absorbing heat of the heat generating part 200 accommodated in the cooling duct 400. The shape of the cooling fan 450 may be properly determined depending on the amount of air flux necessary for cooling, the shape of the cooling duct 400, and so forth.

The image projecting apparatus 1 may further include a sub cooling fan (not shown) depending on the amount of air flux necessary to cool the heat generating part 200 and an additional cooling of the heat generating part 200 disposed adjacently to the inlets 103a and 103b.

The sub cooling fan may be coupled to at least one of the first inlet 103a and the second inlet 103b. Then, the sub cooling fan supplies the external air to the inlet duct 410 communicated with the inlets 103a and 103b. Accordingly, the amount of air drawn in can be increased by adding the sub cooling fan.

The image projecting apparatus 1 according to the embodiment of the present invention may further include a light intercepting member 460 preventing the light emitted from the light source part 21 from leaking to the outside through the outlet 105 of the main body casing 100.

Referring to FIGS. 4 and 7, the light intercepting member 460 is disposed in the outlet duct body 441 adjacent to the outlet 105 of the main body casing 100 to block the emitted light of the lamp 213. Referring to FIG. 4, the light intercepting member 460 is accommodated in the outlet duct body 441.

The light intercepting member 460 preferably has such a shape as to minimize channel blocking of the outlet duct 440 so that the internal air absorbing heat of the heat generating part 200 is smoothly exhausted outside of the main body casing 100. For example, referring to FIG. 4, the light intercepting member 460 having a planar shape may be disposed substantially parallel with the channel of the outlet duct 440.

The light intercepting member 460 may have a curved shape in a lengthwise direction thereof as necessary.

Accordingly, light may be substantially prevented from leaking through the outlet 105 to the outside, and a flowing noise of air may be substantially prevented. Also, because air in the first partitioned channel 448a absorbs heat of high temperature from the lamp 213, the temperature of the air in the first partitioned channel 448a is higher than that of air in the first outlet channel 447a and the second partitioned channel 448b. Accordingly, the light intercepting member 460 may mix air having different temperatures.

The image projecting apparatus 1 according to an exemplary embodiment of the present invention may further include a sound absorbing member 470 for reducing a cooling noise.

Referring to FIG. 4, the sound absorbing member 470 may be coupled to an inner surface of the outlet duct 440. The sound absorbing member 470 may be disposed to an inner surface of the inlet duct 410 as necessary. The sound absorbing member 470 is formed of rubber or a sponge, and is coupled to the inner surface of the outlet duct 440 by means of a known coupling means, such as an adhesive. The sound absorbing member 470 may comprise a porous sound absorbing member, a planar sound absorbing member, or any other suitable member. Because a sound absorbing ability depends on the porousness and the thickness of the material, the configuration of the sound absorbing member 470 is properly determined depending on a noise frequency band to be absorbed.

The image projecting apparatus 1 according to an exemplary embodiment of the present invention may further include a temperature sensor (not shown) measuring the temperature of an inner part of the cooling duct 400, and a control part (not shown) for maintaining the temperature of an inner part of the cooling duct 400 within a predetermined range. The control part controls on and off of the cooling fan 450 to maintain the temperature of the cooling channel of the cooling duct 400 measured by the temperature sensor to be within the predetermined range. The control part may control the rotating speed of the cooling fan 450 as necessary.

With this configuration, an operation of the image projecting apparatus 1 according to an exemplary embodiment of the present invention is described.

When a main power is supplied to the image projecting apparatus 1, the power supplying part 240 supplies power to the cooling fan 450, the ballast 260, and other driving parts. The ballast 260 drives the lamp 213 to emit light. The light emitted from the lamp 213 is transformed to an image light while passing through the color wheel 310, the lighting lens 330, the reflecting mirror 340 and the prism, and is projected on a plane, such as the screen, through the projecting lens 350 to form an image.

Hereinafter, flow of external air generated by operation of the cooling fan 450 inside the image projecting apparatus 1 is described by referring to FIG. 7. As shown in FIG. 7, external air 'A' drawn in through the second inlet 103b cools the display element 220 (FIG. 3) accommodated in the second inlet duct 430, and then is guided to the first inlet duct 420 through the first inlet duct coupling part 427. The external air 'A' flowing over the display element 220 and external air 'B' drawn in through the first inlet 103a cool the element driving part 230 and the power supplying part 240 accommodated in the first inlet duct 420. The external air 'A' and the external air 'B' are joined in the first inlet duct 420, and flow through the cooling fan 450 to be guided to the first outlet channel 447a and the second outlet channel 447b.

Part of the guided external air 'C' cools the ballast 260 and the wheel driving part 250 accommodated in the first outlet channel 447a, and the rest thereof 'D' and 'E' cools the light source part 210 accommodated in the second outlet channel 447b. The external air accelerated by the converging member 449 in the first partitioned channel 448a rapidly discharges internal air 'E' heated by heat exchanges with lamp 213 to the outlet 105. The external air flowing through the second partitioned channel 448b discharges internal air 'D' heated by heat exchanges with the reflecting mirror of the lamp supporting member 215 to the outlet 105.

Referring to FIG. 7, internal air 'C' and internal air 'D' respectively flowing through the first exhaling channel 447a and the second partitioned channel 448b are joined with internal air 'E' flowing through the first partitioned channel 448a in the outlet joining channel 440a having a bent shape and decreasing the temperature of internal air 'E'. Accordingly, the internal air is exhausted to the outside of the image projecting apparatus 1 at a temperature lower than internal air 'E'. The internal air joined in the outlet joining channel 440a flows through the light intercepting member 460 and is mixed and exhausted to the outside through the outlet 105 of the main body casing 100.

Accordingly, the image projecting apparatus 1 according to exemplary embodiments of the present invention may cool all the heat generating parts 200 with one cooling fan 450, thereby providing a simple and efficient cooling configuration. Additionally, the simplified cooling configuration reduces manufacturing processes necessary to assemble the image projecting apparatus 1.

Additionally, in the cooling configuration of the image projecting apparatus 1 according to an exemplary embodiment of the present invention, the heat generating part 200 is accommodated in the cooling duct 400 to use most of the external air in cooling the heat generating part 200 without leakage, thereby improving cooling efficiency.

Additionally, the image projecting apparatus 1 according to an exemplary embodiment of the present invention minimizes the number of cooling fans 450, thereby substantially reducing noises and material costs.

As described above, an exemplary embodiment of the present invention provides an image projecting apparatus simplifying a cooling configuration for cooling a heat generating part, thereby improving cooling efficiency, and substantially reducing noises and costs.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image projecting apparatus, comprising:
a main body casing comprising a plurality of inlets and an outlet spaced from the plurality of inlets;
a heat generating part that generates heat in an inner part of the main body casing, the heat generating part comprising
a light source part comprising a lamp for emitting light, and a lamp supporting member for supporting the lamp;
a ballast for driving the light source part;
a wheel driving part for driving a color wheel separating the light emitted from the light source part into red, green and blue;
a display element for using the light emitted from the light source part to generate an image signal;
an element driving part for driving the display element; and
a power supplying part for supplying power;
a cooling duct coupled to the main body casing communicating between the plurality of inlets and the outlet, and comprising a channel guiding cooling air drawn in through the plurality of inlets to the heat generating part and accommodating the heat generating part therein;
a channel dividing member dividing a channel of the outlet duct into a first outlet channel cooling the ballast and the wheel driving part and a second outlet channel cooling the light source part to separately guide the cooling air supplied from the cooling fan; and
a cooling fan disposed in the cooling duct,
wherein the cooling duct comprises an inlet duct disposed between the plurality of inlets and the cooling fan and an outlet duct disposed between the cooling fan and the outlet.

2. The image projecting apparatus according to claim 1, wherein the outlet is disposed in a side part of the main body casing.

3. The image projecting apparatus according to claim 2, wherein the plurality of inlets are disposed in a lower part of the main body casing adjacent to the heat generating part.

4. The image projecting apparatus according to claim 1, wherein the plurality of inlets comprises
a first inlet and a second inlet spaced from each other, and
the inlet duct comprises a first inlet duct communicating the first inlet with the cooling fan to guide the cooling air to the element driving part and the power supplying part, and a second inlet duct communicating the second inlet with the first inlet duct to guide the cooling air to the display element.

5. The image projecting apparatus according to claim 4, further comprising at least one sub cooling fan coupled to at least one of the first inlet and the second inlet to generate the cooling air.

6. The image projecting apparatus according to claim 1, wherein a surface of the channel dividing member facing the light source part is coated with an ultraviolet filter to transmit a visible ray emitted from the light source part.

7. The image projecting apparatus according to claim 1, wherein the outlet duct comprises an outlet joining channel in which the cooling air exhausted from the first outlet channel and the cooling air exhausted from the second outlet channel are joined.

8. The image projecting apparatus according to claim 1, further comprising a channel partitioning member partitioning the second outlet channel into a first partitioned channel cooling a lamp of the light source part and a second partitioned channel cooling the lamp supporting member of the light source part.

9. The image projecting apparatus according to claim 8, wherein the first partitioned channel further comprises a converging member converging the cross section of the channel thereof to guide the cooling air to the lamp.

10. The image projecting apparatus according to claim 1, further comprising a light intercepting member disposed in the outlet duct to substantially prevent the light emitted from the light source part from being transmitted to the outlet.

11. The image projecting apparatus according to claim 1, further comprising a sound absorbing member coupled to an inner part of the outlet duct to substantially prevent noises generated by flow of the cooling air.

12. The image projecting apparatus according to claim 1, wherein the channel dividing member of the cooling duct has a planar shape to divide the cooling air and to form an upper channel and a lower channel.

13. The image projecting apparatus according to claim 12, wherein the cooling duct further comprises a channel converging member disposed in the upper channel of the channel dividing member to converge the cooling air flowing through the upper channel in a direction.

14. The image projecting apparatus according to claim 13, wherein the channel converging member has a conical shape, the cross section of which tapers in a flow direction of the cooling air.

15. The image projecting apparatus according to claim 1, wherein the cooling duct further comprises a channel dividing member dividing the channel into a first outlet channel cooling a first portion of the heat generating part and a second outlet channel cooling a second portion of the heat generating part to separately guide the cooling air supplied from the cooling fan; and a channel partitioning member partitioning the second outlet channel into a first partitioned channel cooling a third portion of the heat generating part and a second partitioned channel cooling a fourth portion of the heat generating part.

16. The image projecting apparatus according to claim 15, wherein the channel dividing member and the channel partitioning member are connected to each other to be substantially T-shaped.

* * * * *